United States Patent

[11] 3,632,035

[72] Inventor: Donald J. Wheeler, Kent, Ohio
[21] Appl. No.: 869,623
[22] Filed: Oct. 27, 1969
[45] Patented: Jan. 4, 1972
[73] Assignee: Guild Metal Joining Equipment Company, Bedford, Ohio

[54] STRIP SHEARING AND WELDING APPARATUS
13 Claims, 7 Drawing Figs.

[52] U.S. Cl. ................................................. 228/4, 219/78, 228/5, 228/44
[51] Int. Cl. ................................................. B23k 1/20, B23k 37/04
[50] Field of Search ................................................. 228/4, 5; 219/78, 82, 112

[56] References Cited
UNITED STATES PATENTS

| | | | |
|---|---|---|---|
| 3,510,045 | 5/1970 | Petros et al. | 228/5 |
| 3,247,354 | 4/1966 | Mallet et al. | 228/6.5 |
| 3,198,931 | 8/1965 | Klempay | 219/124 |
| 3,064,869 | 11/1962 | Cooper | 219/78 |
| 2,957,071 | 10/1960 | Cooper et al. | 219/82 |

Primary Examiner—John F. Campbell
Assistant Examiner—R. J. Craig
Attorney—Oberlin, Maky, Donnelly & Renner ABSTRACT: A strip shearing and welding apparatus in which the exit end strip clamp assembly remains stationary and the entry end clamp assembly is indexed after shearing to bring the leading end of the new strip clamped thereby into proper alignment with the trailing end of the old strip for welding. The welding assembly is mounted for vertical movement with the exit end clamp assembly to avoid damage to the weld assembly through premature opening of the clamp assembly and maintain the location of the weld assembly both vertically and horizontally with respect to the exit end clamp assembly for proper orientation of the weld assembly with respect to the strip end held thereby.

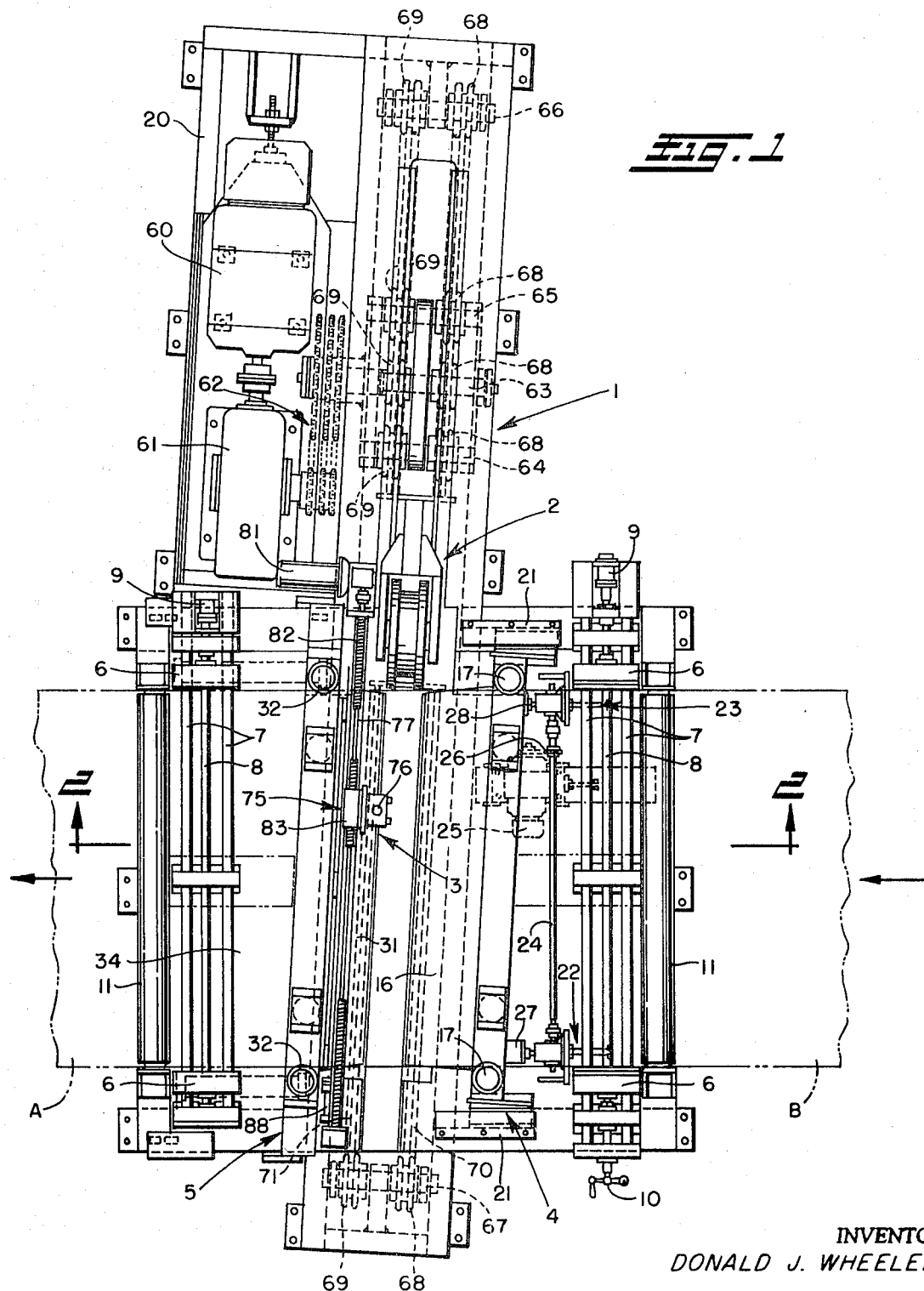

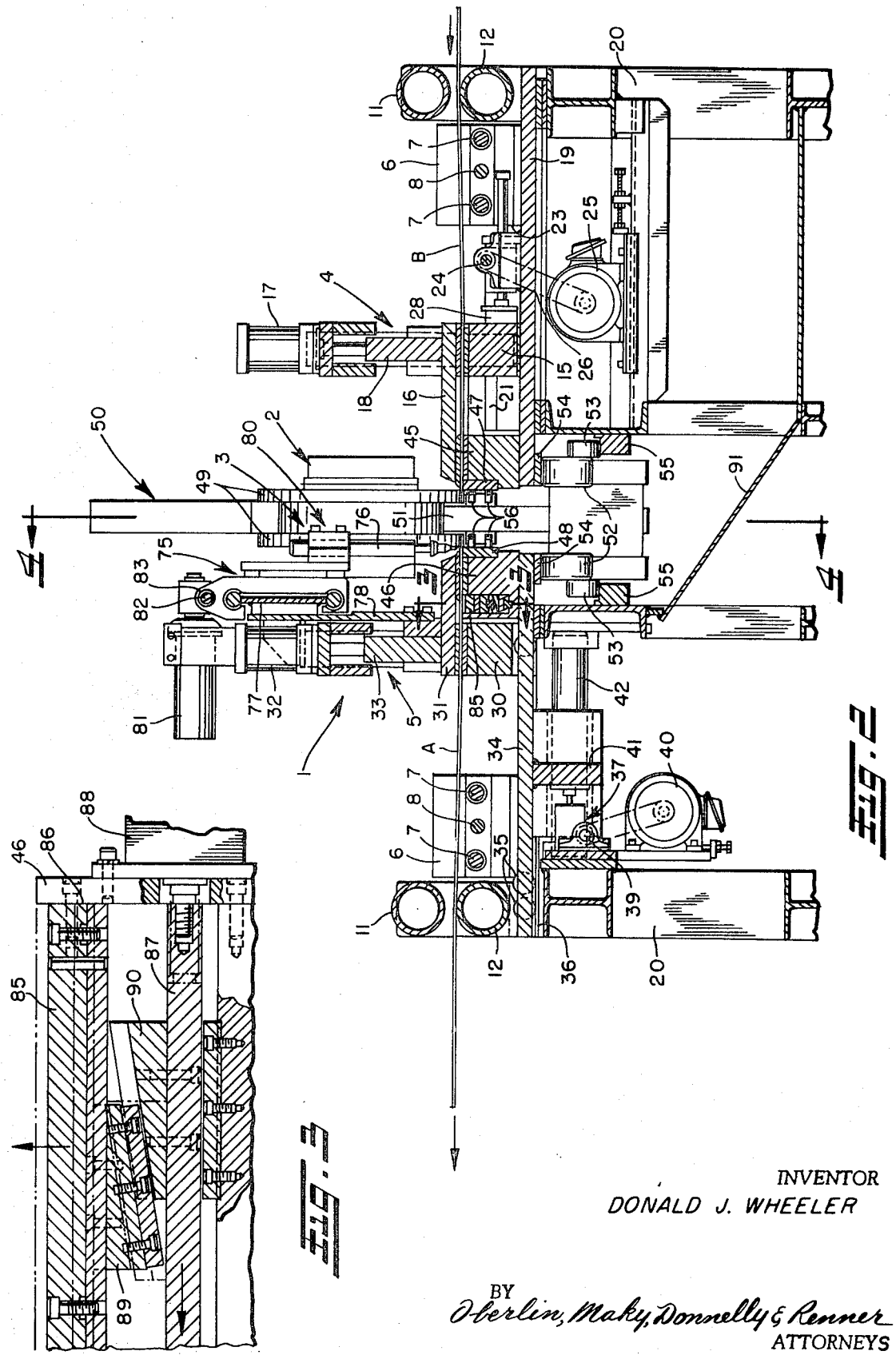

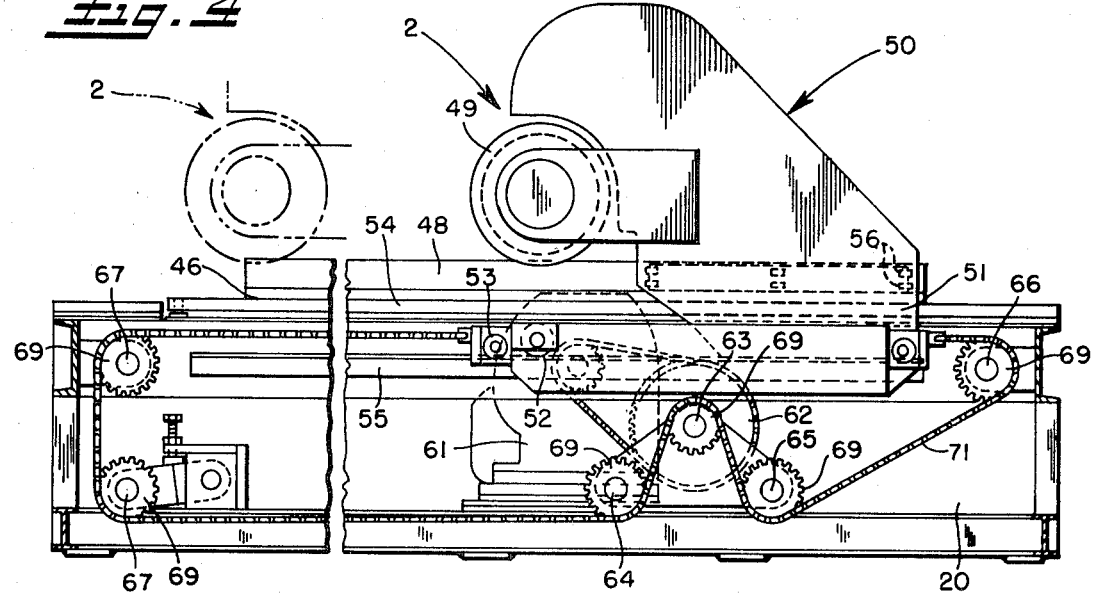
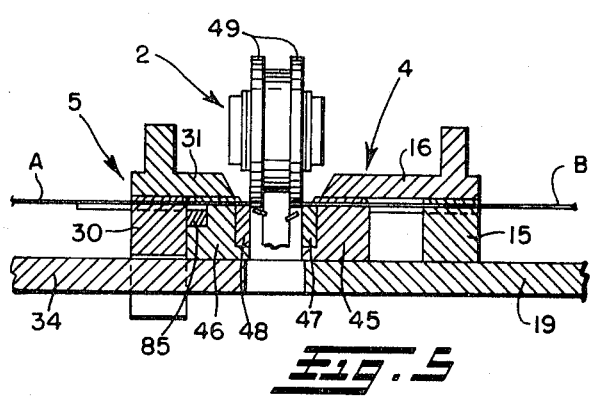
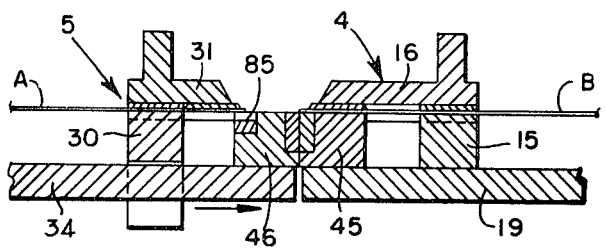
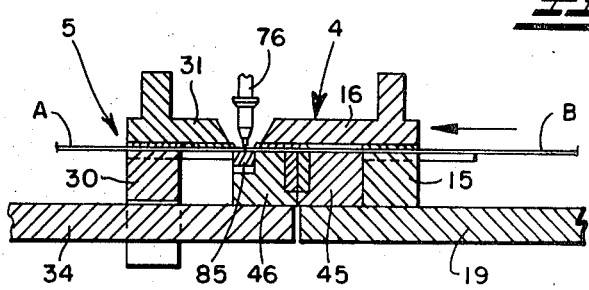
INVENTOR
DONALD J. WHEELER

STRIP SHEARING AND WELDING APPARATUS

BACKGROUND OF THE INVENTION

This invention relates generally as indicated to a strip shearing and welding apparatus, and, more particularly, to an improved apparatus by which the ends of a pair of strips to be joined are continuously clamped during both the shearing and joining operations to eliminate any possibility of strip misalignment after shearing, and the welding assembly is carried by the exit end strip clamp assembly for vertical movement therewith to avoid damage to the welding assembly by premature opening of the exit clamp assembly and maintain accurately the disposition of the welding assembly both vertically and horizontally with respect to the nose of the exit clamp assembly.

In most continuous strip processing operations which include apparatus for joining the leading end of a new strip to the trailing end of the old strip being processed, both the exit and entry end clamp assemblies are indexed toward each other after shearing to orient properly the strip ends prior to welding. Making both clamp assemblies movable toward and away from each other adds considerably to the cost of the apparatus, and also necessitates performing the additional step of forming a loop or hump in the trailing end of the old strip to provide sufficient slack for indexing of the strip from the shear position to the welding position.

Another drawback of most previous strip shearing and joining apparatus is the inherent danger of damaging the welding or other strip joining apparatus through premature opening of the strip clamp assemblies prior to the movement of the welding assembly out of the way. Difficulty is also oftentimes encountered in accurately locating the welding apparatus both vertically and horizontally with respect to the strip ends to be welded. This is particularly the case where the clamp assemblies are indexed a greater or lesser amount to vary the weld gap between the strip ends, or where the thickness of the strips varies from time to time.

More recently, a strip clamp assembly of the type shown and described in U.S. Pat. No. 3,403,833, granted to Donald J. Wheeler and Victor Lohrenz on Oct. 1, 1968, has been devised which permits continuous clamping of the strip ends during both the shearing and welding operations without having to form a loop in the trailing end of the processed strip. The exit end clamp assembly is maintained stationary and only the entry clamp assembly is is indexed toward the exit end clamp assembly after shearing for proper orientation of the strip ends prior to welding. Although such a strip clamp assembly has been found to operate quite satisfactorily, both shear block assemblies are required to be mounted for movement between the shearing and welding positions, and sufficient clearance must be maintained between the shear block assemblies when in the welding position for receipt of the weld backup bar therebetween. Moreover, no provision is made for protecting the welding assembly from damage by premature opening of the clamp assemblies, and the welding assembly is not accurately located both vertically and horizontally with respect to the clamp assemblies.

BACKGROUND OF THE INVENTION

With the foregoing in mind, it is a principal object of this invention to provide a combination strip shearing and welding apparatus in which the exit end clamp assembly is stationary and only the entry end clamp assembly is indexed to bring the leading end of the new strip into proper alignment with respect to the trailing end of the processed strip for welding. The entry end shear block assembly is also fixed, whereas the exit end shear block assembly carries the weld backup bar and is mounted for indexing movement to bring the weld backup bar carried thereby into and out of the welding position. The weld backup may be retracted to avoid damage thereto by the cut edges of the strips during relative sliding movement therebetween.

Yet another object is to provide such a combination strip shearing and welding apparatus in which the welding assembly is mounted for vertical movement with the exit and clamp assembly to avoid damage to the weld assembly in the event that the exit clamp assembly is opened prior to withdrawal of the weld assembly and maintain the location of the weld assembly both vertically and horizontally with respect to the exit clamp assembly, thus to accurately locate the weld assembly with respect to the strip end clamped thereby.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawing:

FIG. 1 is a top plan view of a preferred form of strip shearing and welding apparatus constructed in accordance with this invention;

FIG. 2 is a vertical longitudinal section through the apparatus of FIG. 1, taken on the plane of the line 2—2;

FIG. 3 is an enlarged transverse section through the weld backup bar and actuating mechanism therefore, taken on the plane of the line 3—3 of FIG. 2;

FIG. 4 is a partial longitudinal section through the drive mechanism for the shear assembly, taken on the plane of the line 4—4 of FIG. 2; and FIGS. 5 through 7 are schematic diagrams showing progressively the various steps which are followed in the shearing and joining of strip ends using the apparatus of the present invention.

DESCRIPTION OF THE PREFERRED EMBODIMENT

Referring now in detail to the drawings, there is shown in FIGS. 1 and 2 a preferred form of combination strip shearing and welding apparatus 1 in accordance with this invention which generally comprises a shear assembly 2 for shearing of the ends of a pair of strips A and B, a weld assembly 3 for joining the strip ends together subsequent to shearing, and a pair of longitudinally spaced clamp assemblies 4 and 5 for securely clamping the strip ends during both the shearing and welding operations, in a manner to be subsequently described.

Suitable guides 6 located adjacent opposite sides of the strips A and B outwardly of the respective clamp assemblies 4 and 5 accurately maintain the strips in line with each other. Such guides 6 may be laterally movable on guide rods 7 toward and away from each other for accommodating strips of different widths. A drive shaft 8 having threads of opposite hand engaging a pair of guides 6 may be provided, whereby rotation of the drive shaft 8 in opposite directions either through actuation of a drive motor 9 suitably coupled to the drive shaft 8 or by rotation of a hand crank 10 will cause the guides 6 to slide in or out along the guide rods 7. Vertically spaced guide rolls 11 and 12 may also be provided adjacent opposite ends of the apparatus 1 for receipt of the strips therebetween, directing the strips between the guides 6 and preventing undue vertical movement of the strips.

The clamp assembly 4 adjacent the entry end of the apparatus 1 generally consists of an elongated platen 15 extending transversely beneath the strip material being processed and an elongated clamping beam 16 also extending transversely across the strip and mounted for vertical movement into and out of engagement with the platen 15 for clamping of the strip material therebetween. Raising and lowering of the movable clamping beam 16 may be achieved by actuation of a cylinder 17 vertically fixed with respect to the platen 15 and having a piston rod 18 suitably connected to the clamping beam 16 for raising and lowering of the clamping beam during reciprocation of the rod 18.

Below the clamp assembly 4 there is a platform 19 fixed with respect to the main support frame 20 and having suitable slideways 21 thereon for engagement by the platen 15 thus to permit limited longitudinal sliding movement of the entry clamp assembly 4 toward and away from the exit clamp assembly 5 for a purpose to be subsequently explained. A pair of jackscrews 22 and 23 mounted on the platform 19 adjacent opposite sides of the platen 15 may be connected together through a drive rod 24 and driven by a motor 25 and suitable drive coupling 26 for automatic movement of the clamp assembly 4 back and forth along the slideways 21. By changing the size of couplings 27 and 28 between the platen 15 and jackscrews 22 and 23, the angular orientation of the clamp assembly 4 with respect to the strip material may be varied as desired depending on the desired angle of cut and weld of the strip ends to be made.

The exit clamp assembly 5 also includes an elongated platen 30 extending transversely beneath the strip material and an elongated clamping beam 31 mounted for vertical movement into and out of engagement with the platen 30 upon actuation of a cylinder 32 which reciprocates the piston rod 33 and clamping beam 31 connected thereto. A platform 34 is also provided below the platen 30. However, the platen 30, instead of being slidable along the platform 34, is fixed at its ends relative to the main support frame 20 except for limited adjustment of the angle at which the clamp assembly 5 traverses the web material, and the platform 34 is mounted for limited movement toward and away from the stationary platform 19, For that purpose, rollers 35 may be provided on the platform 34 for engagement with guide rails 36 on the main support frame 20, and jackscrews 37 supported by the main support frame 20 and connected together by a drive rod 39 may be actuated by a drive motor 40 for moving the platform 34 back and forth. A flange 41 projecting downwardly from the platform 34 provides a suitable mounting surface for connecting the jackscrews 37 to the platform, and guide rods 42 may extend through openings in the flange 41 for guiding the platform 34 during such movement.

Mounted on the inner ends of the platforms 19 and 34 are a pair of longitudinally spaced elongated shear blocks 45 and 46 (see FIG. 2) each supporting an elongated shear knife 47 and 48 extending transversely of the strips at the desired angle. With the lower shear blocks 45 and 46 and clamp assemblies 4 and 5 in the shear position shown in FIGS. 1 and 2, the clamping beams 16 and 31 substantially overhang their respective platens 15 and 30 and terminate just short of the cutting edges of the shear knives 47 and 48 for firmly pressing the strips A and B against the lower shear blocks during the shearing operation, to be subsequently described.

The shear assembly 2 also consists of a pair of spaced-apart slitter shear blades 49 mounted on a carriage 50 supported from beneath the stationary shear blocks 45 and 46 by a center plate 51 extending downwardly between the shear blocks. A plurality of guide rollers 52 and 53 carried by the center plate 51 engage oppositely facing guide rails 54 and 55, respectively, for supporting the carriage 50 for movement along the guide rails between the shear blocks 45 and 46 when in the shear position shown. Additional rollers 56 may also be provided on opposite sides of the center plate 51 for engagement with the opposed faces of the shear knives 47 and 48 to maintain proper alignment between the slitter shear blades 49 and lower shear knives 47 and 48 and insure proper knife separation during transverse movement of the carriage 50 across the strips.

For driving the carriage 50 back and forth along the guide rails 54 and 55, there is provided a reversible drive motor 60 and speed reducer unit 61 supported by the main frame 20 which through a suitable gear and chain drive 62 rotates a stationary drive shaft 63 extending transversely of the path of travel of the carriage 50. As seen in FIGS. 1 and 4, on opposite sides of the drive shaft 63 there are a pair of stationary idler shafts 64 and 65, and additional idler shafts 66 and 67 are located adjacent opposite ends of the path of travel of the carriage 50. Mounted on each of the shafts 63 through 67 are pairs of sprockets 68 and 69 about which a pair of chains 70 and 71 are reeved with opposite ends suitably attached to opposite ends of the carriage 50. Rotation of the main drive shaft 63 in opposite directions by the drive motor 60 causes the chains 70 and 71 to move in opposite directions for pulling the carriage 50 back and forth along the guide rails 54 and 55.

Alternatively, the carriage 50 may be driven by a conventional screw-drive arrangement, or a piston-cylinder assembly may be used for actuating the smaller size units.

The weld assembly 3 is also mounted for transverse movement across the strips for welding the sheared ends of the strips together after the strip ends have been sheared and properly indexed with respect to each other in a manner to be subsequently explained, and consists of a carriage 75 on which is mounted a torch 76 or other welding apparatus, such as a seam welding wheel, spot welding electrodes, spot stitch equipment, or flash butt welding apparatus. Such carriage 75 is mounted for sliding movement along a guide rail 77 suitably attached to the clamping beam 31 of the exit clamp assembly 5 by a riser plate 78. Accordingly, damage to the welding apparatus 76 due to raising of the clamping beam 31 prior to withdrawal of the welding carriage 75 from overhead is eliminated, since the weld assembly 3 moves vertically with the clamping beam 31. Moreover, such mounting of the weld assembly 3 on the exit clamping beam 31 also accurately maintains the location of the welding apparatus 76 both vertically and horizontally with respect to the nose of the exit clamping beam 31 and thus with respect to the edge of the strip clamped thereby. Because the welding apparatus 76 moves vertically with the exit clamping beam 31 as aforesaid, the welding apparatus will always remain the same vertical distance away from the strips when clamped regardless of the thickness of the strips. Of course, a suitable adjustable clamping device 80 may be provided for vertically adjusting the height of the welding device with respect to the edge of the exit clamping beam 31.

Movement of the weld carriage 75 back and forth along the guide rail 77 may be achieved by actuation of a reversible drive motor 81 mounted at one end of the exit clamping beam 31. The drive motor 81 is coupled to a screw shaft 82 also supported by the exit clamping beam 31 and extending parallel to the guide rail 77, such screw shaft 82 threadedly engaging a drive nut 83 on the weld carriage 75.

Prior to traversing the strips by the weld carriage 75, the entry clamp assembly 4 is indexed toward the stationary shear block 45 with the strip B still clamped thereby to accurately locate the sheared leading end of the strip B with respect to the sheared trailing end of the strip A, which is held stationary. For properly supporting the strip ends at the welding position during the welding operation, the movable platform 34 is also indexed relative to the stationary exit clamp assembly 5 to bring the weld backup bar electrode 85 carried by the exit shear block 46 into underlying relation with the sheared strip ends.

As best seen in FIG. 3, the backup bar electrode 85 is mounted for vertical movement in a recess 86 in the exit shear block 46, and there is an axially movable slide 87 extending through the recess 86 below the backup bar electrode 85. A piston-cylinder assembly 88 located at one end of the exit shear block 46 is suitably connected to the slide 87 for reciprocating the same back and forth, and there are a plurality of wedge blocks 89 and 90 respectively bolted to the backup bar electrode 85 and slide 87 which may be keyed together as shown for positively raising and lowering the backup bar electrode 85 during reciprocation of the slide 97. The slide 87 may also be keyed to the bottom of the recess 86 as shown. Such a construction permits the backup bar electrode 85 to be recessed during indexing movement of the exit shear block 46 toward the entry shear block 45 to avoid sliding contact between the backup bar electrode 85 and cut edges of the strips which might damage the backup bar electrode. When in proper vertical alignment with the cut edges, the piston-cylinder assembly 88 may be actuated to raise the backup bar electrode 85 into position firmly pressing the ends of the strips against the noses of the elongated clamping beams 16 and 31 to securely hold such strip ends in place during welding.

For a more complete understanding of the operation of the apparatus 1, reference may be had to FIGS. 5 through 7, which show schematically the various steps of the shearing and welding operations. In FIG. 5, the entry clamp assembly 4 and exit shear block 46 are shown retracted to the shear position with the clamp assemblies 4 and 5 closed for firmly clamping the series A and B adjacent their respective trailing and leading ends, and the slitter shear blades 49 are in position for movement transversely across the strips, during which they cooperate with the shear knives 47 and 48 to shear the scrap material from the ends of the strips. A scrap chute 91 may be provided below the carriage guide rails 54 and 55 (see FIG. 2) for catching the scrap material which is cut from the ends of the strips and drops between the shear blocks 45 and 46 during the shearing operation.

Upon completion of the shearing operation, the carriage 50 for the shear assembly 2 is retracted out of the line of the strips, and the platform 34 and exit shear block 46 are indexed to bring the weld backup bar electrode 85 into vertical alignment with the sheared end of the strip A, but with such electrode retracted so as to avoid damage to the electrode by the cut edge of the strip A as shown in FIG. 6. The adjacent face of the entry shear block 45 provides a stop surface for engagement by the exit shear block 46 to locate the backup bar electrode 85 at the welding station.

Next the entry clamp assembly 4 is indexed to bring the sheared leading end of the strip B into proper alignment with the sheared trailing end of the strip A for welding, and the weld backup bar electrode 85 is raised to press firmly the ends of the strips against the noses of the clamping beams 16 and 31 as shown in FIG. 7 through actuation of the slide 87 as previously described. Alternatively, the backup bar electrode 85 may be wedged up and down during movement toward and away from the weld position, and the entry clamp assembly 4 may be indexed to the weld position prior to or during such indexing movement of the backup bar electrode. The back side of the entry shear block 45 may act as a stop surface for locating the entry clamp assembly 4 in the weld position, but it will be appreciated that the gap between the sheared strip ends may be varied as desired.

With the strip ends in the weld position, the carriage 75 for the welding mechanism is actuated to cause the welding mechanism to traverse the strips as shown in FIG. 7, welding the strip ends together during the pass. After completion of the welding operation, the clamp assemblies are opened to release the strip for continued movement through the strip processing equipment in the line.

From the foregoing, it can now be seen that the combination strip shearing and welding apparatus of the present invention eliminates the need for having to form a loop or hump in the trailing end of the processed strip to facilitate indexing between the shearing and welding stations. The exit clamp assembly is longitudinally fixed and remains in the same position during both the shearing and welding operations; only the entry clamp assembly 4 moves between the shearing and welding positions to bring the leading end of the new strip into proper alignment with the trailing end of the old strip for welding.

Moreover, the welding mechanism is mounted for vertical movement with the exit clamp assembly to avoid damage to the welding mechanism in the event that the exit clamp assembly is opened prior to withdrawal of the welding mechanism, and the weld backup bar electrode is carried by the exit shear block which is laterally movable to bring the backup bar electrode into proper alignment with the sheared strip ends at the welding station. By mounting such weld backup bar electrode for vertical movement within a recess in the exit shear block and maintaining the weld backup bar electrode recessed until properly located beneath the strip ends, damage to the weld backup bar electrode by the cut edges of the strips is avoided.

Although the strip shearing and welding apparatus of the present invention is primarily designed for use in securing together the ends of metal strips, it will be apparent that such apparatus may also be used for shearing and securing together strips and sheets of plastic and other materials.

I, therefore particularly point out and distinctly claim as my invention:

1. Apparatus for use in joining the ends of a pair of strips together comprising a main support frame, a pair of longitudinally spaced shear blocks, one of said shear blocks being longitudinally fixed with respect to said main support frame, means mounting the other shear block for longitudinal movement toward and away from said fixed shear block between longitudinally spaced strip-joining and strip-shearing positions, a pair of longitudinally spaced strip clamp assemblies associated with said shear blocks, said strip clamp assembly associated with said movable shear block being fixed against longitudinal movement, and means mounting said strip clamp assembly associated with said fixed shear block for longitudinal movement toward and away from said fixed strip clamp assembly between such strip-joining and strip-shearing positions, said fixed strip clamp assembly including means for clamping a first strip against said movable shear block in both the shearing and joining positions, and said movable strip clamp assembly including means for clamping a second strip against said fixed shear block in the shearing position and against said movable shear block after movement of said movable shear block and strip clamp assembly to the strip-joining position.

2. The apparatus of claim 1 further comprising a backup bar carried by said movable shear block for movement from a first position out of alignment with the strip ends when said movable shear block is in the shear position to a position underlying the strip ends after shearing of the strip ends and indexing of said movable shear block and strip clamp assembly to the strip-joining position.

3. Apparatus for use in joining the ends of a pair of strips together comprising a pair of longitudinally spaced shear blocks, means mounting one of said shear blocks for longitudinal movement toward and away from the other shear block between longitudinally spaced strip-joining and strip-shearing positions, a pair of longitudinally spaced strip clamp assemblies associated with said shear blocks, means mounting one of said strip clamp assemblies for longitudinal movement toward and away from the other strip clamp assembly between such strip-joining position and strip-shearing position, and a backup bar carried by said movable shear block for longitudinal movement with said movable shear block from a first position out of alignment with the strip ends when said movable shear block is in the shear position to a position underlying the strip ends after shearing of the strip ends and indexing of said movable shear block and strip clamp assembly to the strip-joining position.

4. The apparatus of claim 3 wherein said backup bar is received in a recess in said movable shear block, and means are provided for raising and lowering said backup bar in said recess.

5. The apparatus of claim 4 wherein said last-mentioned means comprises a slide, means for reciprocating said slide beneath said backup bar, and wedge means interconnecting said slide and backup bar for raising and lowering said backup bar during such reciprocation of said slide.

6. The apparatus of claim 1 wherein each of said strip clamp assemblies comprises a platen, and a clamping beam vertically movable toward and away from said platen for clamping of a strip therebetween, and there is a strip-joining means mounted on the clamping beam of said fixed strip clamp assembly for vertical movement therewith for accurately locating said strip-joining means both horizontally and vertically with respect to the strip clamped by said fixed strip clamp assembly.

7. Apparatus for use in joining the ends of a pair of strips together comprising a pair of longitudinally spaced shear blocks, means mounting one of said shear blocks for longitudinal movement toward and away from the other shear block between longitudinally spaced strip-joining and strip-shearing positions, a pair of longitudinally spaced strip clamp assemblies associated with said shear blocks, and means mounting one of said strip clamp assemblies for longitudinal movement toward and away from the strip clamp assembly between such strip-joining and strip-shearing positions, each of said strip clamp assemblies comprising a platen, and a clamping beam vertically movable toward and away from said platen for clamping of a strip therebetween, and strip-joining means mounted on the clamping beam of said other strip clamp assembly for vertical movement therewith for accurately locating said strip-joining means both horizontally and vertically with respect to the strip clamped by said other strip clamp assembly.

8. The apparatus of claim 7 further comprising means mounting said strip-joining means for movement along the clamping beam of said other strip clamp assembly transversely across the strips clamped thereby.

9. The apparatus of claim 8 wherein said last-mentioned means comprises a screw shaft supported by the clamping beam of said fixed strip clamp assembly, a motor on the clamping beam of said fixed strip clamp assembly for rotating said screw shaft, a guide rail on the clamping beam of said fixed strip clamp assembly, and a carriage for said strip-joining apparatus supported for movement along said guide rail, said screw shaft threadedly engaging said carriage for moving said carriage along said screw shaft during rotation of said screw shaft.

10. The apparatus of claim 1 further comprising a movable shear assembly adapted to cooperate with said shear blocks when in the shearing position for shearing the ends of such strip clamped by said strip clamp assemblies in the shearing position, and means mounting said movable shear assembly for transverse movement across the strips, said mounting means for said movable shear assembly being supported below said shear blocks.

11. The apparatus of claim 6 wherein said shear assembly comprises a carriage, a pair of shears supported by said carriage, and a center plate extending downwardly from said carriage for movement between said shear blocks when in the shear position, and said means mounting said movable shear assembly for movement comprises guide rails below said shear blocks, and rollers on said center plate engaging said guide rails for movement therealong.

12. The apparatus of claim 11 further comprising rollers on opposite sides of said center plate for engagement with the opposed faces of said shear blocks when in the shear position for maintaining proper alignment between said shears of said movable shear assembly and said shear blocks during transverse movement of said movable shear assembly across the strips.

13. The apparatus of claim 11 further comprising drive means for moving said carriage along said guide rails, said drive means comprising idler shafts adjacent opposite ends of the path of travel of said movable shear assembly, a drive shaft intermediate said idler shafts, means for rotating said drive shaft, and chain means engaging sprockets on said shafts, said chain means having opposite ends secured to opposite ends of said carriage, whereby rotation of said drive shaft in opposite directions pulls said chain means back and forth thus moving said carriage along said guide rails.

* * * * *